United States Patent Office 3,565,779
Patented Feb. 23, 1971

3,565,779
IRRADIATION CROSS LINKED COPOLYMERS OF N-SUBSTITUTED AMIDES OF UNSATURATED CARBOXYLIC ACIDS CONTAINING ACETO OR BENZOPHENONE GROUPS
Walter Lüders, Neu Isenburg, Günter Messwarb, Kelkheim, Taunus, and Hartmut Steppan, Wiesbaden, Germany, assignors to Farbwerke Hoechst Aktiengesellschaft vormals Meister Lucius & Bruning, Frankfurt am Main, Germany, a corporation of Germany
No Drawing. Filed Jan. 10, 1968, Ser. No. 696,726
Claims priority, application Germany, Jan. 18, 1967, F 51,274
Int. Cl. C08d 1/00; C08g 1/12
U.S. Cl. 204—159.14                    12 Claims

ABSTRACT OF THE DISCLOSURE

Copolymers of olefinically unsaturated compounds and light-sensitive, N-substituted amides of unsaturated carboxylic acids containing aceto- or benzophenone groups are prepared and subsequently cross-linked by the action of light.

---

The present invention provides a process for preparing copolymers which are cross-linked under the action of light.

It is already known that polar monomers having a vinylidene structure combined with light sensitive esters of acrylic and methacrylic acids can be copolymerized with aceto- and benzophenones having hydroxyl groups, the products obtained, after having been shaped, are exposed to the action of light, whereby a cross-linking or grafting is brought about. It is, furthermore, known that ethylene can be polymerized with acrylic esters and methacrylic esters of aceto- and benzophenone derivatives having hydroxyl groups, and the copolymers obtained can be cross-linked by exposing them to light. Cross-linking brought about by these known processes, however, involves certain disadvantages since the cross-linking reaction can only be carried out comparatively slowly and under the action of luminous rays of relatively high energy.

We have now found a process for preparing cross-linked copolymers, which comprises copolymerizing unsaturated compounds of the general Formula I:

(I) $\quad CH_2=C\begin{smallmatrix}R_1\\R_2\end{smallmatrix}$ with unsaturated amides of the Formula II:

(II) 

under known conditions and subjecting the copolymers obtained to a cross-linking or—in the presence of further monomers—to a grafting reaction by exposure to light having a wavelength in the range of from 2000 to 7000 A. In the two above Formulae I and II:

$R_1$ represents H, Cl, Br, F, CN, CHO, $C_6H_5$, $OC_6H_5$, $OCOR_3$, $COR_3$, $CO-OR_3$, $OR_4$ $CO-N\begin{smallmatrix}R_3\\R_5\end{smallmatrix}$ $NR_4-CO-R_5$, $NR_4-CO-OR_4$,

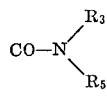

$R_2$ has the meaning of $R_1$ or represents an alkyl radical having from 1 to 4 carbon atoms;
$R_3$ and $R_5$ each represents a hydrogen atom or an alkyl radical having from 1 to 4 carbon atoms;
$R_4$ represents an alkyl radical having from 1 to 4 carbon atoms;
$R_6$ represents a halogen or hydrogen atom or an alkyl- or alkoxy radical having from 1 to 4 carbon atoms;
$R_7$ represents a hydrogen atom

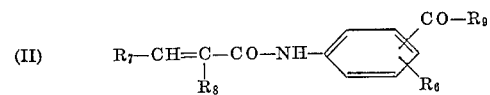

$COOR_2$ or $COOR_{10}$;
$R_8$ has the meaning of $R_3$ or represents $CH_2-CONH-R_4$ $CH_2-CONH-\begin{smallmatrix}\\ \\R_6\end{smallmatrix}\hspace{-2mm}\diagdown\hspace{-2mm}\begin{smallmatrix}CO-R_9\\ \\ \end{smallmatrix}$ $CH_2-COOR_2$ or $CH_2-COOR_{10}$;
$R_9$ has the meaning of $R_4$, $C_6H_5$ or an aryl radical substituted by an alkyl- or alkoxy group or halogen atoms;
$R_{10}$ represents

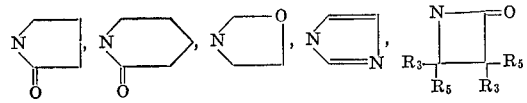

or $CH_2-CH_2-O-\begin{smallmatrix}\\ \\R_6\end{smallmatrix}\hspace{-2mm}\diagdown\hspace{-2mm}\begin{smallmatrix}CO-R_9\\ \\ \end{smallmatrix}$ The copolymers prepared by the process of the invention are distinguished by a high sensitivity to light and can be cross-linked or grafted under the action of relatively long-wave light. This has the advantage, inter alia, that the desired reactions by light can be carried out by a radiation from simple light sources. The secondary reactions induced by light in polymers are of a considerable technical importance since the mechanical properties can be improved by this method. For example, the dimensional stability of plane shaped articles made from polymers can be improved, the resistance of coatings to chemicals can be increased and the resistance of films and sheets to organic solvents is improved considerably.

The secondary reaction induced by light can especially be carried out after the copolymers have been processed into shaped articles, such as coatings, films, filaments, strands or pipes.

The reactions by light proceed especially smoothly using monomer combinations from which relatively hydrophilic copolymers characterized by their solubility in water or alcohols, can be prepared. For preparing these relatively hydrophilic copolymers, it is also possible additionally to use small amounts of water-soluble comonomers of the above-mentioned Formula I. As such water-insoluble comonomers there may be mentioned vinyl acetate, methylmethacrylate and ethylene. In the majority of cases, products having improved properties are obtained by using water-insoluble comonomers in addition.

In the copolymers prepared according to the invention, the proportion of the incorporated light-sensitive monomers of the above-mentioned Formula II is, generally, within the range of from 0.01 to 40, preferably from 0.1 to 20, percent by weight.

Generally, the light-sensitive monomers (polymer units) of Formula II used in accordance with the invention are characterized in that mono- and dicarboxylic acids having a single unsaturation are linked as semi- and diamides to the aceto- or benzophenone groups. In the case of dicarboxylic acid amides, introducing a single aceto- or benzophenone group is already sufficient to produce the desired effects as to a high sensitivity to light of the polymers. Benzophenone groups generally provide more favorable effects than acetophenone groups.

For carrying out the process of the invention, it is preferable to use as monomers of the Formula I nitrogen-containing compounds of the Formula I, for example acrylamide, methacrylamide, monomethyl-acrylamide, dimethyl-acrylamide, monomethyl-methacrylamide, dimethyl-methacrylamide, N-methyl-N-vinylformamide, N-methyl-N-vinylacetamide, N-vinylpyrrolidone, N-ethyl-N-vinylacetamide, N-methyl-N-vinyl-carbamic acid ethyl ester, N-vinyl-oxazolidinone, N-vinyl-caprolactame, N-methyl-N-vinyl-azetidinone, 4,4'-dimethyl - N - vinyl-azetidinone, 3,4'-dimethyl-N-vinylazetidinone, N-vinyl-imidazole. Further suitable monomers of Formula I are, for example, acrylonitrile, acrylic acid esters, such as methyl- or ethylacrylate, methacrylic acid esters, such as methyl-methacrylate, vinyl esters, such as vinyl-formiate, vinyl-acetate, vinylpropionate, maleic acid ester, vinyl-chloride or vinyl-fluoride, and ethylene.

The copolymers of the invention are prepared under known conditions in the presence of catalysts yielding free radicals. For starting the polymerization there are suitable, for example, benzoyl peroxide, di-tert.-butyl-peroxide, tert-butyl-peracetate, di-isopropyl- and di-tert.-butyl-peroxy-dicarbonate, laurylperoxide, cyclohexyl-sulfonylperoxide. In aqueous systems—in the emulsion polymerization—derivatives of hydrogen peroxide may also be successfully used. These substances, for example ammonium persulfate, may also be used, if desired in combination with reducing agents, for example sodium sulfite, iron-(II)salts or sugars, for carrying out the redox polymerization.

As compounds yielding free radicals, there may, furthermore, be used azo compounds which can be split under heat, for example α,α'-azo-dicyclohexane carboxylic acid nitrile, α,α'-azo-diisobutyric acid nitrile and α,α'-azo-diisobutyric acid amide.

It is also possible to use coordination catalysts for carrying out the process of the invention. In many cases, ionic catalysts are also useful.

For carrying out the process of the invention, it is, in many cases, advantageous to operate in the presence of inert solvents or dispersing agents, in particular of water and/or lower alcohols.

The copolymers prepared by the process of the invention can be processed by known methods into films, coatings, filaments, strands or pipes. Cross-linked products having especially advantageous properties are obtained when care is taken that the material to be shaped is thoroughly sintered and compressed during the processing. Inclusions of air and humidity should be avoided as far as possible.

For starting the cross-linking reaction to be effected under the action of light, light sources of the most various types are suitable. Cross-linking may be brought about under the action of light having a wave length in the range of from 2000 to 7000 A. As already stressed, the process of the invention involves the advantage of bringing about the cross-linking by means of light sources producing an only moderate or very low proportion of ultraviolet light.

For carrying out a grafting reaction in exposed shaped articles made of the copolymers prepared according to the invention, there are suitable all unsaturated vinyl compounds which are known to yield a favorable grafting rate under the conditions of radical initiating. For example, it is possible successfully to incorporate by swelling the following monomers into the copolymers to be grafted and to react them under the action of light: acrylamide, acrylonitrile and acrylic acid esters.

The following examples serve to illustrate the present invention, but they are not intended to limit it thereto, the parts and percentages being by weight.

EXAMPLE 1

Under an atmosphere of nitrogen, 375 parts of dioxane and 20 parts of the monomer mixture indicated in the following table were introduced together with 100 parts of dioxane and 0.5 part of azo-diisobutyronitrile into a polymerization vessel protected against light. The mixture was heated while stirring to 80° C. and, within 1 hour, the remaining ⅘ of the monomer mixture indicated in the table were then added dropwise thereto.

The reaction mixture was maintained at a temperature of 80° C. for 4 hours and then 0.5 part of azo-diisobutyronitrile in 25 parts of dioxane were added thereto. Stirring was then continued for another 8 hours at 80° C.

Table (a) 99 parts of N,N-dimethyl-acrylamide and 1 part of

(b) 99 parts of N,N-dimethyl-acrylamide and 1 part of

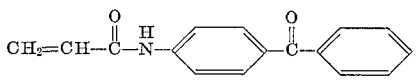

(c) 85 parts of N,N-dimethyl-acrylamide, 10 parts of vinyl acetate and 5 parts of

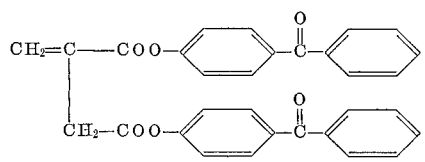

(d) 85 parts of N,N-dimethyl-acrylamide, 10 parts of vinyl acetate and 5 parts of

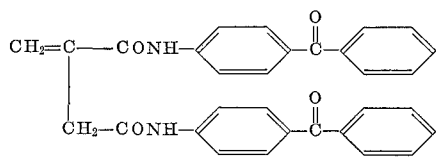

The polymer solutions obtained showed such a solids content as indicates a conversion rate of practically 100%. Wehn the polymer solutions thus obtained were diluted with 9 times the amount of water and were allowed to stand for 1 hour at room temperature, in cases (a) and (b) entirely clear solutions are obtained; in cases (c) and (d) solutions which were turbid in traces (the same degree of turbidity) were obtained. This proves the presence of copolymers.

The solutions (a) to (d) obtained by the polymerization were applied to aluminum foils having roughened surfaces, and then dried to form films.

The following film weights were determined gravimetrically (milligram per dm.²): (a) 23.5; (b) 26.2; (c) 20.9; (d) 21.7.

The films were then exposed to light radiated in stages by a commercial xenon impulse lamp (helical) of 5000 watts (type COP X P 5000 manufactured by W. Staub GmbH., Neu Isenburg, Germany). The distance between the lamp and the films was 1 meter.

The light of the xenon lamp penetrated a Tempax® glass plate (3 millimeters thick) produced by Jenaer Glaswerke Schott & Gen., Mainz, Germany. Then, part of the test surface was covered with a window pane having a thickness of 3 millimeters. After the light had been switched off, the action of light was determined by showering the foil with water, drying it, dipping it into an ethanolic solution of Victoria blue B having 1 or 2% strength (CJ 44045), showering it again with water and finally drying it. When treated in this manner, a film which had been cross-linked by the light adhered to its carrier foil and showed a blue color. An uncross-linked film was dissolved and removed from the foil by this treatment with water;

its parts did not absorb a dyestuff and showed the grey tint of the carrier material. The following results were obtained:

| Relative time, min. | a ester type | b amide type | c ester type | d amide type |
|---|---|---|---|---|
| 2 | − | − | − | Trace + |
| 5 | − | − | − | + |
| 10 [1] | − | + | Trace + | + |
| 20 [1] | − | + | + | + |
| 20 [2] | + | + | + | + |

NOTE: + means cross-linking; − means no cross-linking.
[1] Exposed to light through a windowpane.
[2] Exposed to light without cover with a windowpane.

The table clearly shows that the films obtained from the copolymers of the invention according to Examples 1(b) and 1(d), are far more sensitive to light than films produced with copolymers prepared according to known processes. Especially, Test 1a illustrates the detrimental filtering effect of the windowpane which only allows the long-wave portion of the ultraviolet light to penetrate.

EXAMPLE 2

A polymerization vessel protected against light was filled under an atmosphere of nitrogen with 75 parts of dioxane and ⅕ of the following mixture: 18 parts of N,N-dimethyl-acrylamide, 2 parts of 4-acrylamido-benzophenone, 20 parts of dioxane and 0.1 part of azo-diisobutyronitrile. The mixture was heated while stirring to 80° C. and, within 1 hour, the remaining ⅘ of the above mixture were added dropwise thereto. After a period of 4 hours at 80° C., 0.1 part of azo-diisobutyronitrile in 5 parts of dioxane were added thereto. Stirring was then continued for another 8 hours at 80° C. Solids content: 16.7%.

EXAMPLE 3

The polymerization was carried out as disclosed in Example 2 except that 16 parts of N,N-dimethyl-acrylamide and 4 parts of 4-acrylamido-acetophenone were used as monomers. Solids content: 16.7%.

EXAMPLE 4

The polymerization was carried out as disclosed in Example 2, except that 19 parts of N,N-dimethyl-acrylamide and 1 part of fumaric acid di-benzophenone amide were used as monomers. Solids content: 16.6%.

EXAMPLE 5

The polymerization was carried out as disclosed in Example 2 except that 17 parts of N,N-dimethyl-acrylamide, 2 parts of vinyl acetate and 1 part of itaconic acid di-benzophenone amide were used as monomers. Solids content: 16.7%.

EXAMPLE 6

The polymerization was carried out as disclosed in Example 2, except that 10 parts of tert.-butylacrylamide, 10 parts of N,N-dimethyl-acrylamide and 1 part of 4-acrylamido-benzophenone were used as monomers. Solids content: 17.5%.

All the copolymers used in Examples 2 to 6 and the polymers prepared without light-sensitive monomers by the same processes were employed for producing films having a thickness of 0.1 millimeter.

At a distance of 10 centimeters and for 1 minute, these films were exposed to the action of ultraviolet rays (from a high pressure mercury vapour lamp (type Q 81), power input 70 watts, original Hanau).

When treated in this manner, films produced from copolymers containing light-sensitive groups, were insoluble in acetone, in contrast to unexposed films made from copolymers having no light-sensitive groups.

We claim:
1. A process for preparing a copolymer capable of being cross-linked by light which comprises copolymerizing at least one unsaturated compound of the general Formula I

(I)     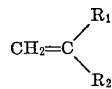

wherein $R_1$ represents H, Cl, Br., F, CN, CHO, $C_6H_5$, $OC_6H_5$, $OCOR_3$, $COR_3$, CO—$OR_3$, $OR_4$,

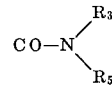

$NR_4$—CO—$R_5$, $NR_4$—CO—$OR_4$,

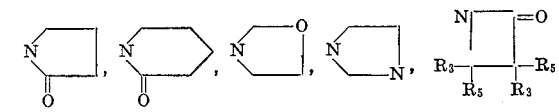

$R_2$ has the same meaning as $R_1$ or represents an alkyl radical having from 1 to 4 carbon atoms; $R_3$ and $R_5$ each represent a hydrogen atom or an alkyl radical having from 1 to 4 carbon atoms; $R_4$ represents an alkyl radical having from 1 to 4 carbon atoms; with 0.01 to 40% by weight, based on the weight of the monomer mixture, of at least one unsaturated amide of the Formula II (II)    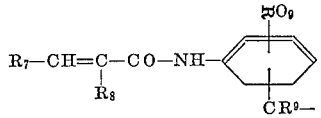

wherein $R_6$ represents a halogen or hydrogen atom or an alkyl- or alkoxy radical having from 1 to 4 carbon atoms; $R_7$ represents a hydrogen atom,

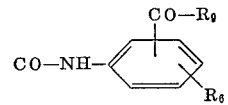

$COOR_2$ or $COOR_{10}$; $R_8$ has the meaning of $R_3$ or represents $CH_2$—CONH—$R_4$,

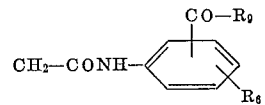

$CH_2$—$COOR_2$ or $CR_2$—$COOR_{10}$; $R_9$ has the meaning of $R_4$, $C_6H_5$ or an alkyl radical substituted by an alkyl- or alkoxy group or halogen atoms; $R_{10}$ represents

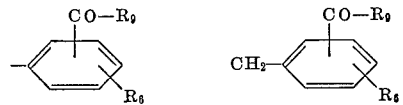

or

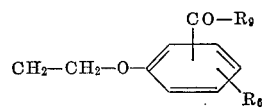

in the presence of a free radical catalyst to form said copolymer.

2. A process for preparing cross-linked copolymers which comprises copolymerizing at least one unsaturated compound of the general Formula I (I)     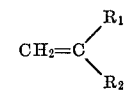

wherein $R_1$ represents H, Cl, Br, F, CN, CHO, $C_6H_5$, $OC_6H_5$, $OCOR_3$, $COR_3$, CO—$OR_3$, $OR_4$,

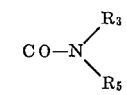

$NR_4$—CO—$R_5$, $NR_4$—CO—O$R_4$,

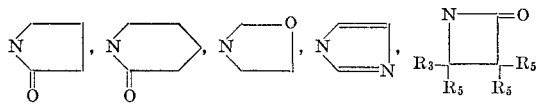

$R_2$ has the same meaning as $R_1$ or represents an alkyl radical having from 1 to 4 carbon atoms; $R_3$ and $R_5$ each represent a hydrogen atom or an alkyl radical having from 1 to 4 carbon atoms; $R_4$ represents an alkyl radical having from 1 to 4 carbon atoms; with 0.01 to 40% by weight, based on the weight of the monomer mixture, of at least one unsaturated amide of the Formula II (II)
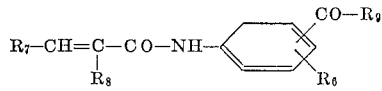

wherein $R_6$ represents a halogen atom or an alkyl- or alkoxy radical having from 1 to 4 carbon atoms; $R_7$ represents a hydrogen atom,

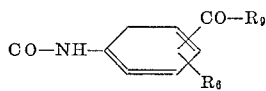

COO$R_2$ or COO$R_{10}$; $R_8$ has the meaning of $R_3$ or represents $CH_2$—CONH—$R_4$,

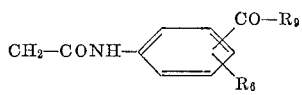

$CH_2$—COO$R_2$ or $CR_2$—COO$R_{10}$; $R_9$ has the meaning of $R_4$, $C_6H_5$ or an alkyl radical substituted by an alkyl- or alkoxy group or halogen atoms; $R_{10}$ represents

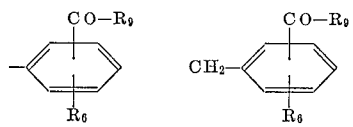

or

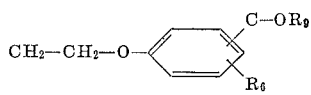

in the presence of a free radical catalyst to form said copolymer, and exposing said copolymer to light having a wave length in the range 2000 to 7000 A. to cross-link it.

3. A process according to claim 2 wherein the copolymer, prior to exposure to light, is blended with a vinyl compound, to cause said vinyl compound to be grafted to said copolymer upon exposure to light.

4. A process according to claim 1 wherein the compound of Formula I is a nitrogen-containing compound.

5. A process according to claim 1 wherein the copolymer is first formed into a shaped article and thereafter cross-linked by exposure to light.

6. A copolymer adapted to be cross-linked by the action of light, said copolymer being prepared from unsaturated compounds of the Formula I (I)
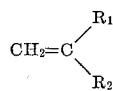

wherein $R_1$ represents H, Cl, Br, F, CN, CHO, $C_6H_5$, O$C_6H_5$, OCO$R_3$, CO$R_3$, CO—O$R_3$, O$R_4$,

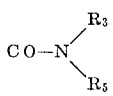

$NR_4$—CO—$R_5$, $NR_4$—CO—O$R_4$,

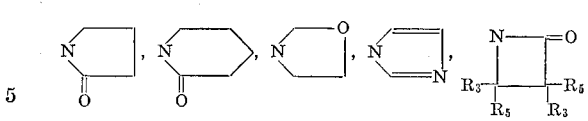

$R_2$ has the meaning of $R_1$ or represents an alkyl radical having from 1 to 4 carbon atoms; $R_3$ and $R_5$ each represent a hydrogen atom or an alkyl radical having from 1 to 4 carbon atoms; $R_4$ represents an alkyl radical having from 1 to 4 carbon atoms; with 0.01 to 40% by weight, based on the weight of monomer mixture, of an unsaturated amide of the Formula II (II)
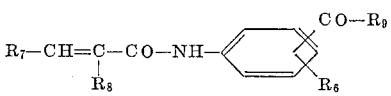

wherein $R_6$ represents a halogen or hydrogen atom or an alkyl- or alkoxy radical having from 1 to 4 carbon atoms; $R_7$ represents a hydrogen atom,

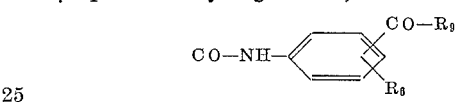

COO$R_2$ or COO$R_{10}$; $R_8$ has the meaning of $R_3$ or represents $CH_2$—CONH—$R_4$,

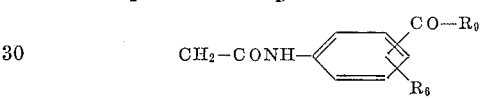

$CH_2$—COO$R_2$ or $CH_2$—COO$R_{10}$; $R_9$ has the meaning of $R_4$, $C_6H_5$ or an aryl radical substituted by an alkyl- or alkoxy group or halogen atoms; $R_{10}$ represents

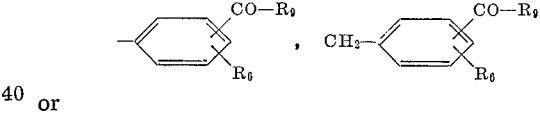

or

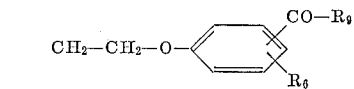

7. A cross-linked copolymer made by exposing the copolymer of claim 6 to light having a wave length of 2000 to 7000 A.

8. A copolymer according to claim 6 wherein the unsaturated compound of Formula I is N,N-dimethylacrylamide.

9. A copolymer according to claim 6 wherein the unsaturated compound of Formula II is 4-acrylamide-benzophenone.

10. A copolymer according to claim 6 wherein the unsaturated compound of Formula II is 4-acrylamide-acetophenone.

11. A copolymer according to claim 6 wherein the unsaturated compound of Formula II is fumaric acid dibenzophenone amide.

12. A copolymer according to claim 6 wherein the unsaturated compound of Formula II is itaconic acid dibenzophenone amide.

References Cited

UNITED STATES PATENTS 3,214,492  10/1965  Tocker _____ 260—878

SAMUEL H. BLECH, Primary Examiner

R. B. TURER, Assistant Examiner

U.S. Cl. X.R.

117—93.31, 132, 161; 204—159.15, 159.16, 159.22; 260—29.6, 62, 63, 275, 881, 885